United States Patent [19]

Miller

[11] Patent Number: 4,759,812
[45] Date of Patent: * Jul. 26, 1988

[54] METHOD AND APPARATUS FOR EFFECTING FIELD REPAIRS IN STRESS CARRYING STRUCTURES

[76] Inventor: Robert W. Miller, 1235 - 19th St., Hermosa Beach, Calif. 90254

[*] Notice: The portion of the term of this patent subsequent to May 14, 2002 has been disclaimed.

[21] Appl. No.: 753,935

[22] Filed: Jul. 11, 1985

[51] Int. Cl.⁴ .............................................. B32B 35/00
[52] U.S. Cl. ................................... 156/98; 29/402.11; 156/94; 264/36; 428/63; 428/86; 428/96; 428/100
[58] Field of Search ............... 24/306, 443; 29/402.09, 29/402.11; 156/94, 98, 91; 264/36; 428/63, 96, 86, 223, 100

[56] References Cited

U.S. PATENT DOCUMENTS 2,795,523 6/1957 Cobb et al. .................. 29/402.11 X
4,239,829 12/1980 Cohen ............................ 156/91 X
4,517,038 5/1985 Miller ................................. 156/98

Primary Examiner—Robert A. Dawson
Attorney, Agent, or Firm—I. Michael Bak-Boychuk

[57] ABSTRACT

A method and structure is disclosed herein for effecting repairs of ballistic damage in stressed aircraft structures, including bending of two thin manually deformable metal sheets each adhesively bonded to one part of a hook and pile fastening material, known as "Velcro", the bent and conformed patches once in place being impregnated with resin. Once the resin hardens the interlocked hook and pile surfaces are fixed, fixing the curvature and stiffness of the resulting patch.

4 Claims, 1 Drawing Sheet

METHOD AND APPARATUS FOR EFFECTING FIELD REPAIRS IN STRESS CARRYING STRUCTURES

BACKGROUND OF THE INVENTION

1. Field of the Invention

The present invention relates to techniques for effecting repairs in aircraft structures, and more particularly to techniques for effecting field fabricated patches in convolved structural members.

2. Description of the Prior Art

In my prior U.S. patent application Ser. No. 553,575, filed on Nov. 21, 1983 and issued as U.S. Pat. No. 4,517,038 on May 14, 1985 I have described a technique for effecting repairs in structural members which can be conveniently carried out in the field. As stated therein military aircraft, and particularly military aircraft dedicated to close ground support in the course of conflict, often suffer ballistic damage as result of ground fire. Characteristically such ballistic damage entails tears and cracks which thereafter form points of stress concentration from which further fracture propagation occurs. For this reason ballistic damage is preferably repaired immediately, particularly if such damage occurs in a stressed surface or a surface carrying aerodynamic loads.

Aerodynamic surfaces, in many instances, involve curved surface shapes, where the curvature of the panel is often used beneficially to carry load. Thus, quite often an airplane structure includes sections of semi-monocoque structure which are contiguous to sections of full monocoque form. The semi-monocoque configurations, as is well known in the art, resolve most of the stress transfer by way of stringers and spars with the skin therebetween being loaded mainly in shear. Monocoque structures, however, impose loading on the skin surface not just in shear but also entailing components of compressive tensile and bending load. Accordingly, any damage to a monocoque structural element, such as damage from a ballistic projectile, will entail concentrations of stress in all of the foregoing modes. For this reason, repair of such damage is a matter of great structural significance and techniques for conveniently effecting such repair have been sought in the past. Heretofore such techniques typically entailed the replacement of the whole panel segment, a replacement which, in the course thereof utilizes the replacement of the original fasteners and thus involves complex procedures not convenient in the field.

Accordingly, techniques for convenient field panel repair have been sought in the past and it is one such technique that is disclosed herein.

SUMMARY OF THE INVENTION

Accordingly, it is the general purpose and object of the present invention to provide a repair technique for repairing damage to monocoque panels.

Yet additional objects of the invention are to provide a technique by which stiff, convolved panels may be formed in the field.

Yet further objects of the invention are to provide a repair technique adapted for field use.

Briefly, these and other objects are accomplished within the present invention by providing a laminate structure comprising two flexible metal skins each adhesively bonded to one surface of a hook and pile material combination known as "Velcro". The flexible panels can then be bent to the shape of the structure to be repaired and once bent the interlocked "Velcro" surfaces may then be impregnated with resin, leaving the resin to harden in place. Once hardened, the resin provides the necessary spacing between the exterior sheet to increase the sectional area moment of inertia and thereby resist bending loads across the cutout that has been first made to take out the ballistic damage. In this manner variously curved stiff structural segments can be formed in the field with the edges of the patch then being fixed to the adjacent load carrying structure.

DESCRIPTION OF THE SPECIFIC EMBODIMENT

Figure 1:
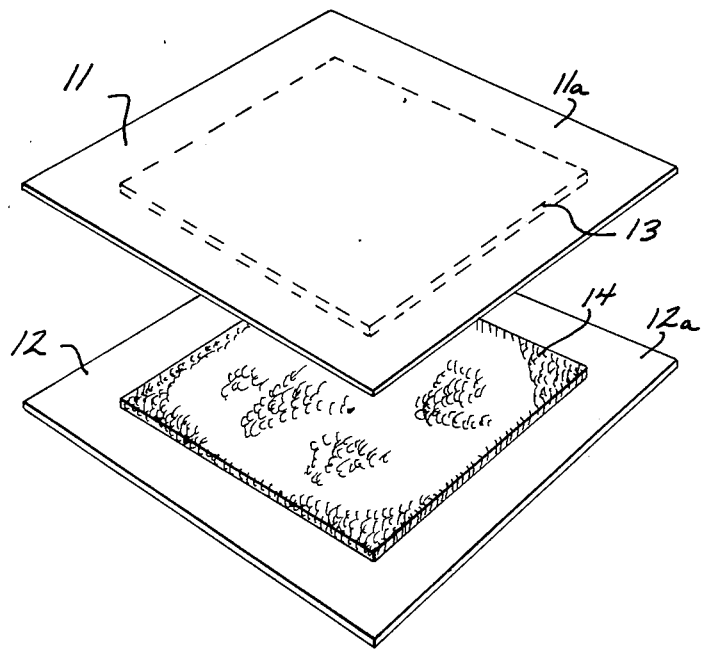
FIG. 1 is a perspective illustration, separated by parts, of an inventive field repair panel constructed according to the present invention.
Figure 2:
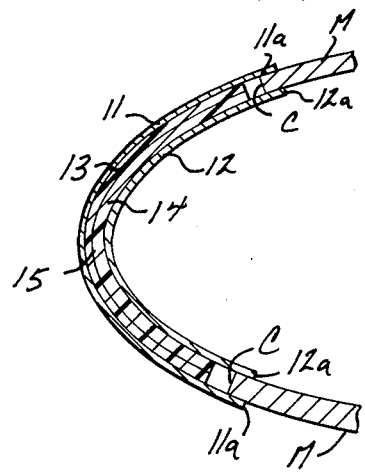
FIG. 2 is a sectional side view illustrating the inventive field repair panel fastened in place on a damaged structure.

As shown in FIGS. 1-4 a typical air frame often includes aerodynamic structures F comprising sections of a semi-monocoque constructions which, in turn, are attached to full monocoque structural elements M. Unlike semi-monocoque structures, fully monocoque structural elements entail transfers of compressive and bending load and thus some structural stiffness in the skin is necessary. Accordingly, any damage to a monocoque structure, shown as damage D, which typically includes tears and other stress concentration points, will resolve the carried stresses by tearing and further propagation of fracture. For this reason structural damage to monocoque panels requires close attention for lack of other structures to carry most of the load like stringers and spars P. As a consequence in order to maintain the aircraft operational, quick field repairs are often necessary to monocoque elements, repairs which heretofore entailed removal of the whole structural segment and the subsequent replacement and fastening of replacements therefor.

Since any aircraft structure entails close considerations of weight, fastening of replacement parts is a critical operation, an operation not conveniently done in the field. As result, in any military conflict aircraft have to be taken out of operation due to unrepairable damage or large structural assemblies have to be stored for replacement.

To alleviate this problem a technique is disclosed herein by which the ballistic damage D is conveniently cut out along cut line C rounded at each corner along an arc A to preclude any stress concentration. Once thus cut out the monocoque element M is ready to receive a patch formed according to the present invention. More specifically, the patch comprises two flexible metal skin elements 11 and 12 each adhesively attached onto the mating hook and pile "Velcro" layers 13 and 14 on one side thereof. In this form sheets 11 and 12 are manually bendable to conform with the adjacent shape of the damaged structure M, one sheet spanning across the interior surface of the damaged cut out C and the other spanning the exterior. Once thus convolved to mate with the repaired surface the two patches or skins 11 and 12 are placed in position to interlock the hook and pile surfaces 13 and 14 which are first impregnated with catalyzed resin 15. The catalyzed resin, initially as yet uncured, then sets up around the interlocking fibers of the "Velcro" surfaces, thus fixing dimensionally the two patch skin elements or surfaces 11 and 12 relative each other. As a consequence, a substantially rigid patch is effected with the edges thereof being bonded to the repaired structure.

The interlocked surfaces 13 and 14 may be made to a dimension smaller than the exterior sheets 11 and 12 to which they are attached, thus forming peripheral strips or edge sections 11a and 12a around each periphery thereof. It is these peripheral strips that then are available for bonding or fastening by fasteners 17, to edges around the cutout C in the damaged structure M.

Figure 3:
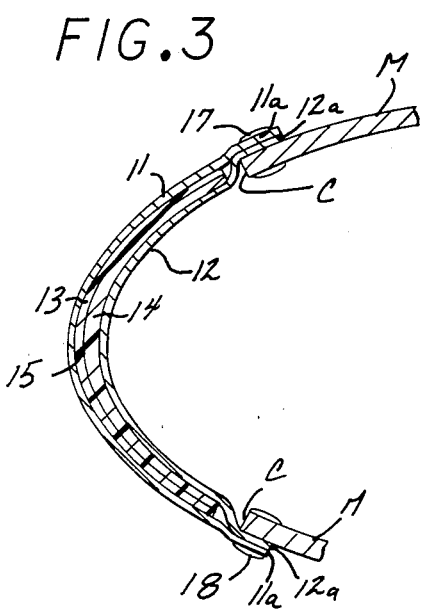
FIG. 3 is yet another side view, in section, of the inventive panel shown in FIG. 2, illustrating an alternative manner of attachment thereof.
Figure 4:
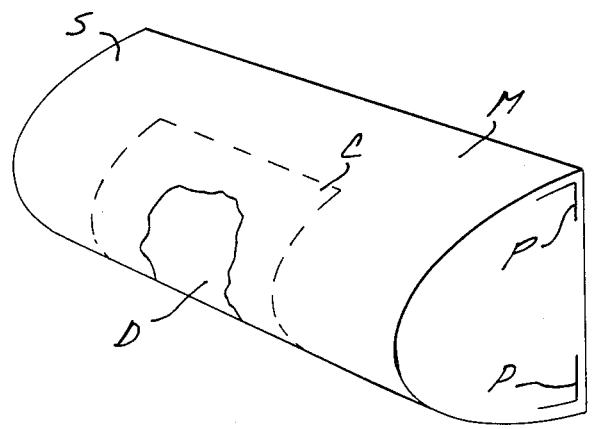
FIG. 4 is a perspective illustration of an aerodynamic structure damaged by a ballistic projectile.

Alternatively, in instances where an interior layup of the patch can not be made fastening may be effected according to the teachings shown in FIG. 3. More specifically, the skins or patches 11 and 12 are once again convolved to the shape of the damaged structure with the peripheral edges or segments 11a and 12a being placed along the exterior surface about the cutout C. Fasteners 18 may then be used to crimp the two skin surfaces together and at the same time to attach the patch to the repaired structure. Like previously set out the "Velcro" segments are once again impregnated with uncured resin which is then cured in place to add stiffness to the resulting patch.

One should note that the foregoing technique for effecting repairs in the field effectively produces a double walled structure, the surfaces of the structure formed by the skin elements 11 and 12 is separated by the cured and set resin. Thus the patch itself then forms an integral monocoque structure capable of taking bending, compression and transverse loads.

Obviously many modifications and changes can be made to the foregoing without departing from the spirit of the invention. It is therefore intended that the scope of the invention be determined solely on the claims appended hereto.

What is claimed is:

1. Apparatus for effecting repairs in stressed shells comprising:
    a first flexible metal skin;
    a first layer of mating hook and pile material adhesively attached to one side of said first metal skin;
    a second flexible metal skin;
    a second layer of hook and pile material selected for engagement with said first layer adhesively attached to one side of said second skin; and
    bonding means for fixing the engagement of said first layer to said second layer.

2. Apparatus according to claim 1 wherein:
    said first and second skins are of a plan form larger than the plan form of the corresponding ones of said first and second layers to provide a peripheral surface around said first and second layers for attachment of said skins to said shells.

3. A method for effecting repairs to damaged stressed shells comprising the steps of:
    adhesively bonding one layer of a mating hook and pile material to one side of a first flexible metal skin;
    adhesively bonding another mating layer of hook and pile material to one side of a second flexible metal skin;
    cutting out the damage in said shell;
    bending said first and second skins to conform with said shell;
    impregnating said one and another layer a fluid compound of a chemical composition which hardens in time; and
    placing the bent skins onto said shell and pressing said one and another layers into engagement relative each other.

4. A method according to claim 3 comprising the further step of:
    fastening the edges of said first and second skins to said shell.

* * * * *